US012719547B2

(12) United States Patent
Kochiev et al.

(10) Patent No.: US 12,719,547 B2
(45) **Date of Patent: *Aug. 25, 2026**

(54) SYSTEMS AND METHODS FOR DYNAMIC MIMO-MODE SWITCHING BASED ON USER DEVICE MOBILITY

(71) Applicant: T-MOBILE INNOVATIONS LLC, Overland Park, KS (US)

(72) Inventors: Timur Kochiev, Irvine, CA (US); Mochamad Mirza, Bothell, WA (US); Relin Thomas, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,310

(22) Filed: Jul. 18, 2024

(65) Prior Publication Data

US 2024/0372596 A1 Nov. 7, 2024

Related U.S. Application Data

(63) Continuation of application No. 18/128,089, filed on Mar. 29, 2023, now Pat. No. 12,088,386.

(51) Int. Cl.
*H04B 7/0452* (2017.01)
*H04B 7/06* (2006.01)
(Continued)

(52) U.S. Cl.
CPC ......... *H04B 7/0686* (2013.01); *H04B 7/0452* (2013.01); *H04W 4/027* (2013.01); *H04W 28/0278* (2013.01)

(58) Field of Classification Search
CPC ... H04L 5/0053; H04L 5/0048; H04L 5/0023; H04L 5/0051; H04L 1/0026; H04L 5/0057; H04L 5/0094; H04L 5/0035; H04B 7/0452; H04B 7/0639; H04B 7/0626; H04B 7/0632; H04B 7/0417; H04B 7/0413;
(Continued)

(56) References Cited

U.S. PATENT DOCUMENTS 8,798,012 B2 * 8/2014 Kazmi ................ H04B 7/0689
455/434
8,989,290 B2 * 3/2015 Jongren ................ H04W 52/36
375/267

(Continued)

OTHER PUBLICATIONS

"SU-MIMO vs MU-MIMO Difference Between SU-MIMO and MU-MIMO", https://ytd2525.wordpress.com/2020/06/13/su-mimo-vs-mu-mimo-difference-between-su-mimo-and-mu-mimo/, downloaded May 5, 2023, 7 pages.

*Primary Examiner* — Eva Y Puente
(74) *Attorney, Agent, or Firm* — SHOOK, HARDY & BACON L.L.P.; Elena K. McFarland

(57) ABSTRACT

Aspects herein provide systems, methods, and media for dynamically switching between multiple input multiple output algorithms to improve spectral efficiency and capacity. In aspects, based on data encoding traffic, user device mobility, and coverage, a base station automatically and intelligently selects and implements a particular downlink operating schema. Using various periodicity, the base station dynamically switches between various downlink operating schemas to reflect changing conditions in the date that encodes traffic, user device mobility, and coverage.

16 Claims, 4 Drawing Sheets

(51) Int. Cl.
*H04W 4/02* (2018.01)
*H04W 28/02* (2009.01)

(58) Field of Classification Search
CPC ...... H04B 7/0689; H04B 7/024; H04B 7/063; H04B 7/0456; H04B 7/0465; H04B 7/0619; H04B 7/0634; H04W 72/23; H04W 72/21; H04W 24/10; H04W 72/20; H04W 84/12; H04W 72/04; H04W 88/06; H04W 52/42; H04W 88/08
See application file for complete search history.

(56) References Cited

U.S. PATENT DOCUMENTS

| | | | | |
|---|---|---|---|---|
| 10,034,292 | B1 * | 7/2018 | Liu | H04W 72/0446 |
| 10,673,497 | B2 * | 6/2020 | Jöngren | H04L 5/0048 |
| 11,394,436 | B2 | 7/2022 | Forenza et al. | |
| 2013/0094464 | A1 * | 4/2013 | Li | H04L 5/0053 370/329 |
| 2015/0365953 | A1 | 12/2015 | Papadopoulos et al. | |
| 2017/0331529 | A1 * | 11/2017 | Lee | H04B 7/0689 |
| 2019/0028155 | A1 | 1/2019 | Hofrichter et al. | |
| 2022/0279535 | A1 | 9/2022 | Tsui | |
| 2023/0016625 | A1 | 1/2023 | Sharma et al. | |

* cited by examiner

302

RECEIVE DATA REPRESENTING USER DEVICE MOBILITY, TRAFFIC LOADING, AND COVERAGE

304

DETERMINE, BASED ON THE DATA REPRESENTING USER DEVICE MOBILITY, TRAFFIC LOADING, AND COVERAGE, A PARTICULAR DOWNLINK OPERATING SCHEMA TO ASSIGN TO A USER DEVICE, THE DOWNLINK OPERATING SCHEMA BEING ONE OF RECIPROCITY-BASED SINGLE-USER MULTIPLE-INPUT MULTIPLE-OUTPUT (SU-MIMO) SCHEMA, NON-RECIPROCITY-BASED SU-MIMO SCHEMA, RECIPROCITY-BASED MULTIPLE-USER MULTIPLE-INPUT MULTIPLE-OUTPUT (MU-MIMO) SCHEMA, OR NON-RECIPROCITY-BASED MU-MIMO SCHEMA

306

SCHEDULE ONE OR MORE COMMUNICATIONS FOR TRANSMISSION FROM THE BASE STATION TO THE USER DEVICE IN ACCORDANCE WITH THE DOWNLINK OPERATING SCHEMA

308

TRANSMIT THE ONE OR MORE COMMUNICATIONS FROM THE BASE STATION TO THE USER DEVICE USING THE PARTICULAR DOWNLINK OPERATING SCHEMA

*FIG. 3.*

SYSTEMS AND METHODS FOR DYNAMIC MIMO-MODE SWITCHING BASED ON USER DEVICE MOBILITY

CROSS REFERENCE TO RELATED APPLICATION

This patent application is a continuation of, and claims the benefit of priority of, Non-Provisional application Ser. No. 18/128,089, filed on Mar. 29, 2023 and entitled "SYSTEMS AND METHODS FOR DYNAMIC MIMO-MODE SWITCHING BASED ON USER DEVICE MOBILITY" which is incorporated herein by reference in its entirety.

TECHNICAL BACKGROUND

The present disclosure generally relates to algorithm selection for telecommunication schema switching.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a method is provided for dynamically switching between multiple-input multiple-output algorithms to improve spectral efficiency and capacity. In aspects, data representing user device mobility, traffic loading, and coverage is provided. Based on user device mobility and one or more of traffic speed and coverage, one downlink operating schema is determined to be assigned to a user device, the downlink operating schema being one of reciprocity-based single-user multiple-input multiple-output (SU-MIMO) schema, non-reciprocity-based SU-MIMO schema, reciprocity-based multiple-user multiple-input multiple-output (MU-MIMO) schema, or non-reciprocity-based MU-MIMO schema. A communication is scheduled for transmission from the base station to the user device in accordance with the one downlink operating schema.

In another aspect, one or more non-transitory computer-readable media are provided for storing instructions that when executed via one or more processors perform a computerized method for dynamically switching between multiple-input, multiple-output algorithms to improve spectral efficiency and capacity. In aspects, data representing user device mobility, traffic loading, and coverage are received. Based on the data representing user device mobility, traffic loading, and coverage, a particular downlink operating schema is determined for assignment to a user device, the downlink operating schema being one of reciprocity-based single-user multiple-input multiple-output (SU-MIMO) schema, non-reciprocity-based SU-MIMO schema, reciprocity-based multiple-user multiple-input multiple-output (MU-MIMO) schema, or non-reciprocity-based MU-MIMO schema. Then, one or more communications are scheduled for transmission from the base station to the user device in accordance with the downlink operating schema, and further, the one or more communications are transmitted from the base station to the user device using the particular downlink operating schema.

In yet another aspect, a system is provided. The system includes one or more processors coupled to a base station. The one or more processors are configured to receive data representing user device mobility, traffic loading, and coverage. Based on the data representing user device mobility, traffic loading, and coverage, the one or more processors determine a particular downlink operating schema to assign to a user device, the downlink operating schema being one of reciprocity-based single-user multiple-input multiple-output (SU-MIMO) schema, non-reciprocity-based SU-MIMO schema, reciprocity-based multiple-user multiple-input multiple-output (MU-MIMO) schema, or non-reciprocity-based MU-MIMO schema. In determining the particular downlink operating schema, the one or more processors are configured to, based on output of a machine learning-algorithm ingesting the data representing user device mobility, traffic loading, and coverage, selecting one algorithm that correspond to one of the reciprocity-based SU-MIMO schema, non-reciprocity-based SU-MIMO schema, reciprocity-based MU-MIMO schema, or non-reciprocity-based MU-MIMO schema. Then, via the one or more processors, one or more communications are scheduled for transmission from the base station to the user device in accordance with the particular downlink operating schema. The one or more communications are further transmitted from the base station to the user device using the particular downlink operating schema.

BRIEF DESCRIPTION OF THE DRAWINGS

Aspects are described in detail below with reference to the attached drawings figures, wherein:

FIG. 3 depicts an example method in accordance with one or more embodiments.

DETAILED DESCRIPTION

Figure 1:
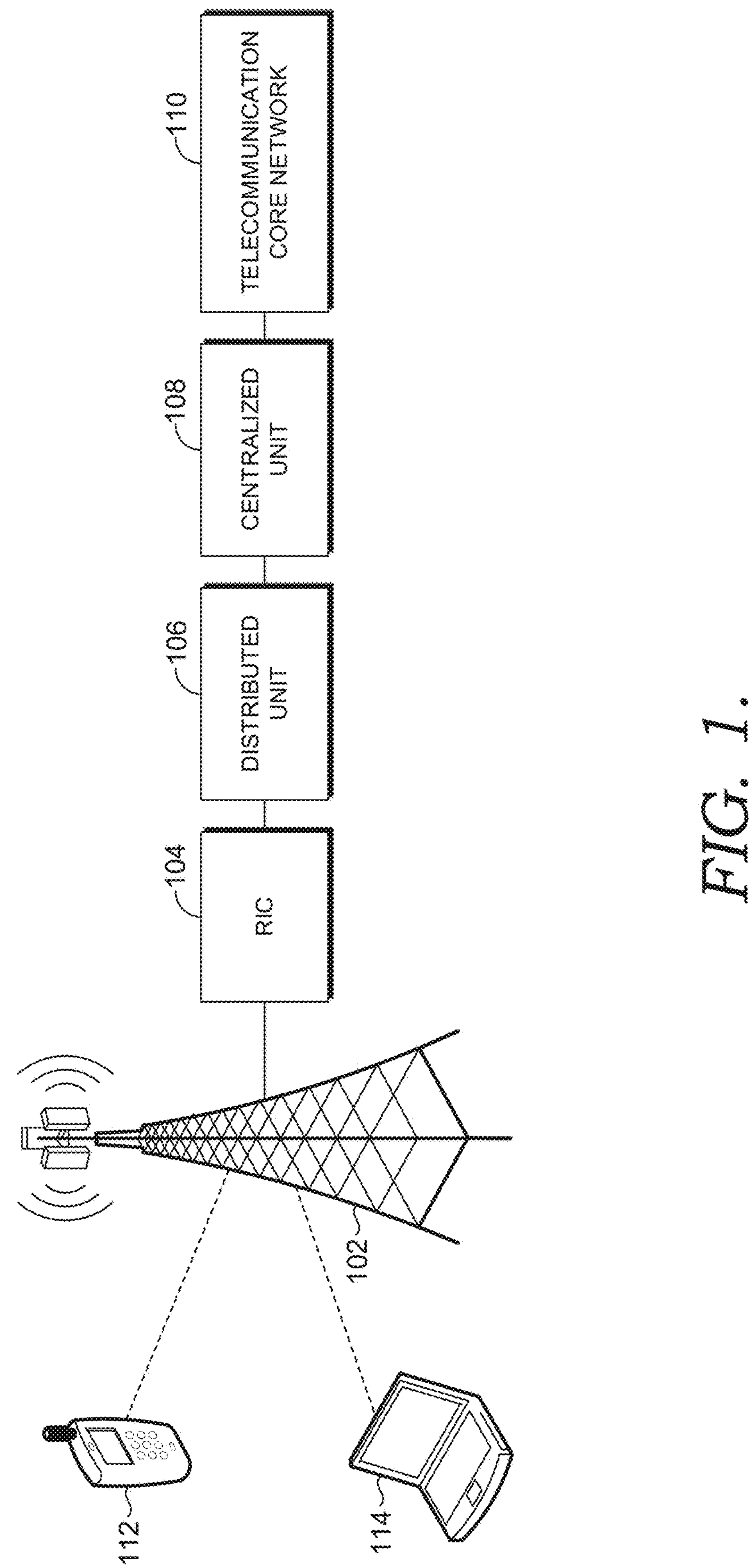
FIG. 1 depicts an example of a system in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G/5G NR Fifth-Generation Wireless Access Technology/New Radio
5GC Fifth-Generation Wireless Access Technology Core Network
AAU Active Antenna Unit
BRS Broadband Radio Service
CD-ROM Compact Disk Read Only Memory
CDMA Code Division Multiple Access
CU Central unit
DU Distribution unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IOT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 400 shown in FIG. 4. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various aspects. Examples of a network include a telecommunications network (e.g., 3G, 4G, 5G, CDMA, CDMA 1XA, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Physical resource block" (PRB) and "actual physical resource block" are used interchangeably to refer to a defined quantity of consecutive subcarriers in a frequency domain that are used for wireless transmission and wireless reception of waveform signals via antenna/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIoT, NB-IoT, and similar technologies without limitation. For this reason, physical resource blocks are discussed herein in a network-agnostic manner, as the aspects discussed herein can be implemented within each of the different technology environments.

"Cell site" is generally used herein to refer to a defined wireless communications coverage area (i.e., a geographic area) serviced by a base station, or a plurality of neighboring base stations working together to provide a single coverage area. Also, it will be understood that one base station may control one cell site, or, alternatively, one base station may control multiple cell sites.

"Access point," "gNodeB," and "base station" may refer to hardware, software, devices, or other components forming a base station or cell tower having an antenna, an antenna array, a radio, a transceiver, and/or a controller. As discussed herein, a base station is a device comprised of hardware and complex software that is deployed in a network so that the base station can control and facilitate, via one or more antenna or antenna arrays, the broadcast, transmission, synchronization, and receipt of wireless signals in order to communicate with, verify, authenticate, and provide wireless communications service coverage to one or more user devices that request to join and/or are connected to the network. Generally, a base station communicates directly with one or more user devices according to one or more access technologies (e.g., 3G, 4G, LTE, 5G, and mMIMO). Examples of a base station include an eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of a base station is not limited to the examples discussed. Base stations may work alone or in concert with one another, locally or remotely, such that each base station is not limited so as to require its own standalone cell tower structure.

"User equipment" (UE), "user device," "mobile device," and "wireless communication device" are used interchangeably to refer to a device having hardware and software that is employed by a user in order to send and/or receive electronic signals/communication over the network. User devices generally include one or more antenna coupled to a radio for exchanging (e.g., transmitting and receiving) transmissions with an in-range base station that also have an antenna or antenna array. In aspects, user devices may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

"Single-user MIMO" (SU-MIMO) refers to specific wireless communications operating schema having a multi-transmitter and receiver technology that enables a wireless access point, such as a base station, to facilitate multiple, simultaneous data streams to one compatible endpoint, such as a user device, at a time. To put it another way, SU-MIMO enables information of a single user device, hence "single user," to be transmitted simultaneously over more than one data stream by a base station in the same time/frequency grid (i.e., resources/resource elements).

"Multi-user, multiple-input multiple-output" (MU-MIMO) technology is a multi-transmitter/receiver technology that enables multiple wireless user devices simultaneously. In MU-MIMO, data streams are distributed across multiple user devices using the same time/frequency resources, but the distribution is based on spatial separation. Generally, MU-MIMO technology is such that the base station divides available bandwidth into separate, individual data streams that share the connection equally between multiple user devices.

The term "reciprocity-based" refers to various technological operating schema that generally relies on information in a Sounding Reference Signals (SRS) in the uplink from user device(s) to identify optimized downlink beams of the base station, and for which transmissions can be scheduled.

The term "non-reciprocity-based" refers to various technological operating schemas that generally rely on signals (e.g., downlink) other than SRS to identify optimized downlink beams of the base station, and for which transmissions can be scheduled. For example, a codebook operating schema utilizes a CRS and a predetermined matrix of complex value elements that transform a data bit to another set of data for mapping to antenna ports.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

FIG. 1 provides a system 100. The system 100 includes a radio unit 102, a radio intelligence controller 104, a distribution unit 106 (also interchangeably referred to as the "distributed unit"), a central unit 108 (also interchangeably referred to as the "centralized" unit), and a telecommunications core network 110 that interfaces with and connects the system 100 and its components to the internet 112.

The radio unit 102 includes software and hardware that convert radio signals received via an antenna into digital signals, which are then communicated to the distribution unit 106. The radio unit 102 can include, for example, one or more radio elements of an antenna or antenna array for transmission and receipt of radio frequency signals, for example, where the antenna is associated with or corresponds to a cell tower or base station. The radio unit 102 can include, for example, converters, power amplifiers, power supplies, bandpass filters, and other components. In one aspect, the radio unit 102 includes Synchronization and Fronthaul Transport components, Lower Physical Layer Baseband Processing components, Digital Front End (DFE) components, and/or RF Front End (RF FE) components, for example, to operate and function with an open RAN (O-RAN). The radio intelligence controller (RIC) 104 is a software component that is communicatively coupled to one or more radio units **102*f*, the distribution unit 106, the central unit 108, or any combination thereof. The radio intelligence controller 104 controls near real-time and non-real-time operations in the system 100**, such as network performance, configurations, life cycle, beam optimization and more, for example.

The distribution unit 106 is associated with and/or supports a physical layer associated with a plurality of physical resource blocks, in aspects. Additionally, the distribution unit 106 can be associated with and/or support a Media Access Control (MAC) layer, a Radio Link Control (RLC) layer, and others.

The central unit 108 provides and/or supports one or more layers in the protocol stack that are supported by or associated with the distribution unit 106. The central unit 108 can be associated with and/or support a Packet Data Convergence Protocol (PDCP) layer, a Service Data Adaptation Protocol (SDAP) layer, a Radio Resource Control (RRC) layer, and others, for example.

In aspects, the system 100 utilizes one or more processors and the components discussed above to perform specific operations and functions as further discussed hereinafter. In various aspects, the radio intelligence controller 104, for example, receives data representing user device mobility, traffic loading, and coverage using signals received or transmitted via the radio unit 102. The data may represent and/or quantify user device mobility as a value specifying a speed of physical movement associated with the user device, for example. The data may represent and/or quantify traffic loading as a total quantity of data held in a buffer, in another example. The data may represent and/or quantify coverage that includes one or more of RSRP value, RSRQ value, or inter-site distance (ISD), in yet another example. Additionally, the data may represent and/or quantify all or any combination of such metrics.

The radio intelligence controller 104 can, based on the data representing user device mobility, traffic loading, and coverage, determine that a particular downlink operating schema is to be assigned to a user device. The radio intelligence controller 104 may determine that a particular downlink operating schema, which can be implemented using a corresponding algorithm, is an optimized operating schema for scheduling and/or communication with the user device based on the data. The downlink operating schema can be one schema selected from the group of reciprocity-based, single-user, multiple-input, multiple-output (SU-MIMO) schema; non-reciprocity-based SU-MIMO schema; reciprocity-based, multiple-user, multiple-input, multiple-output (MU-MIMO) schema; or non-reciprocity-based MU-MIMO schema, in various aspects. Generally, when user device mobility increases, one of non-reciprocity SU-MIMO or non-reciprocity-based MU-MIMO is assigned. When user device mobility decreases, the radio intelligence controller 104 can select one of reciprocity-based SU-MIMO or reciprocity-based MU-MIMO to be assigned, for example. When user device mobility increases, the radio intelligence controller 104 can select one of non-reciprocity-based SU-MIMO or non-reciprocity-based MU-MIMO to be assigned, for example. As user mobility increases, the accuracy of the data reported by the user device through an SRS decreases. For this reason, utilizing a reciprocity-based operating schema becomes suboptimal as it relies on data having low(er)/decreased accuracy in the SRS signal. As such, a non-reciprocity-based operating schema can be selected as user device mobility increases because non-reciprocity-based operating schemas utilize base station-captured data (e.g., codebook), for example. In some aspects, the radio intelligence controller 104 can compare the data for each of the user device mobility, traffic loading, and coverage to one or more corresponding thresholds to determine which particular operating schema, and thus operating algorithm, to implement.

In one example, when the user device mobility meets or exceeds a mobility-specific threshold of 20 kilometers/hour, the radio intelligence controller 104 may determine that the user mobility is "high" and may select one of non-reciprocity-based SU-MIMO or non-reciprocity-based MU-MIMO to be assigned to the user device. Or, when the user device mobility is below a mobility-specific threshold of 20 kilometers/hour, the radio intelligence controller 104 may determine that the user mobility is "low" and may select one of reciprocity-based SU-MIMO or reciprocity-based MU-MIMO to be assigned to the user device.

In another simplified example, when the traffic loading meets or exceeds a traffic-specific threshold of a defined percentage (e.g., 70% or higher, 90% or higher) of physical resource block utilization, the radio intelligence controller 104 may determine the traffic loading is "high" and may select one of reciprocity-based MU-MIMO or non-reciprocity based MU-MIMO. Or, when the traffic loading is less a traffic-specific threshold of a defined percentage of physical resource block utilization, the radio intelligence controller 104 may determine the traffic loading is "low" and may select one of reciprocity-based SU-MIMO or non-reciprocity-based SU-MIMO to be assigned to the user device.

In yet another simplified example, when coverage for a near-cell user device is determined to meet or exceed a coverage-specific threshold (e.g., equal to or greater than −90 dBm RSRP), the radio intelligence controller 104 may determine that coverage is "good" and may select one of reciprocity-based MU-MIMO or reciprocity-based SU-MIMO. When coverage for a far-cell or edge-located user device is determined to be below a coverage-specific threshold (e.g., less than −90 dBm RSRP), the radio intelligence controller 104 may determine that coverage is "poor" and may select one of non-reciprocity-based MU-MIMO or non-reciprocity-based SU-MIMO to be assigned to the user device.

It will be understood however, that these are merely simplified examples as the radio intelligence controller 104 can evaluate one or more of, or all of, user device mobility, traffic loading, and coverage to when making a determining of a schema. For example, when the coverage is less than a coverage-specific threshold ("poor"), the user mobility exceeds the mobility-specific threshold ("high"), and the traffic loading exceeds a traffic-specific threshold ("high"), the radio intelligence controller 104 can determine that a non-reciprocity-based MU-MIMO schema is to be assigned to the user device. In another example, when the coverage is less than a coverage-specific threshold ("poor"), the user mobility exceeds the mobility-specific threshold ("high"), and the traffic loading is below a traffic-specific threshold ("low"), the radio intelligence controller 104 can determine that a non-reciprocity-based SU-MIMO schema is to be assigned to the user device.

In yet another example, when the coverage meets or exceeds a coverage-specific threshold ("good"), the user mobility is less than the mobility-specific threshold ("low"), and the traffic loading exceeds a traffic-specific threshold ("high"), the radio intelligence controller 104 can determine that a reciprocity-based MU-MIMO schema is to be assigned to the user device. In an example, when the coverage meets or exceeds a coverage-specific threshold ("good"), the user mobility is less than the mobility-specific threshold ("low"), and the traffic loading exceeds a traffic-specific threshold ("low"), the radio intelligence controller 104 can determine that a reciprocity-based SU-MIMO schema is to be assigned to the user device.

In some aspects, a machine-learning algorithm is utilized that has been trained using data sets. The data sets that are used for training include historical data for user device mobility, traffic loading, and/or coverage, as corresponding to the same base station, a similar or neighboring base station, and/or one or more other user devices. Based on the output of the trained machine learning-algorithm, in response to ingesting the current data representing user device mobility, traffic loading, and coverage, the radio intelligence controller 104 can determine, identify, and/or select one algorithm that corresponds to one of the reciprocity-based SU-MIMO schema, non-reciprocity-based SU-MIMO schema, reciprocity-based MU-MIMO schema, or non-reciprocity-based MU-MIMO schema, for assignment to communications with the user device.

Figure 2:
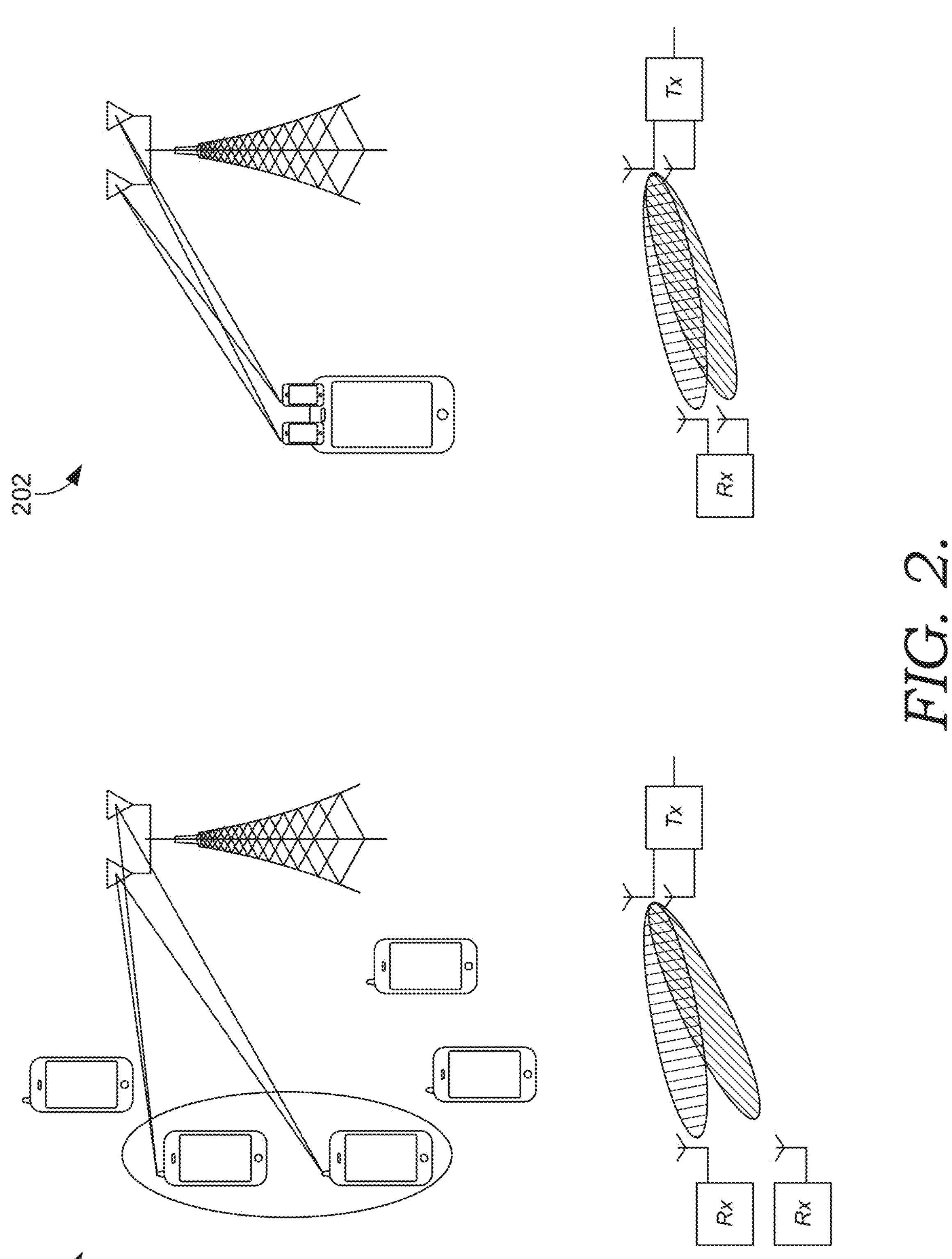
FIG. 2 illustrates a simplified diagram of different operating schemas in accordance with one or more embodiments.

As shown in FIG. 2, when using a SU-MIMO operating schema 202, all the beams or data streams of the antenna arrays of that base station are directed to a single user device. The SU-MIMO operating schema operates by splitting all of the available SINR between multiple data layers that are separately beamformed for the single user device, for example. Generally, SU-MIMO can be used to increase or improve user throughput and system capacity while reducing or preventing interference. As shown in FIG. 2, when using a MU-MIMO operating schema 200, multiple beams or data streams of that base station are directed to multiple user devices, and each individual beam or data stream is directed to multiple user devices (e.g., two or more user devices per stream). The MU-MIMO operating schema operates by sharing (i.e., as opposed to splitting) SINR between multiple data layers and each layer is separately beamformed, for example. Generally, MU-MIMO can be used to enable communications with multiple user devices wile facilitating multiplexing gains. Reciprocity-based MU-MIMO can be determined as a potential operating schema for assignment when, based on the data, there is a combination of decreased user mobility, decreased inter-site distance, and increased loading. Non-reciprocity-based MU-MIMO can be determined as a potential operating schema for assignment when, based on the data, there is a combination of increased user device mobility, increased ISD, and decreased coverage.

Continuing, the radio intelligence controller 104 schedules one or more communications for transmission from the base station to the user device in accordance with the particular downlink operating schema. Further, the radio intelligence controller 104 then transmits the one or more communications from the base station to the user device using the particular downlink operating schema and corresponding algorithm. For example, when the radio intelligence controller 104 determines to assign a non-reciprocity-based MU-MIMO, the radio intelligence controller 104 then schedules and transmits one or more communications from the base station to the user device using non-reciprocity-based MU-MIMO and a corresponding algorithm. When the radio intelligence controller 104 determines to assign a reciprocity-based SU-MIMO operating schema, the radio intelligence controller 104 then schedules and transmits one or more communications from the base station to the user device using reciprocity-based SU-MIMO and a corresponding algorithm, for example.

In further aspects, the radio intelligence controller 104 may subsequently receive additional data representing user device mobility, traffic loading, and coverage. For example, the additional data may be obtained at a later time, thus providing updated information on user device mobility, traffic loading, and coverage to the base station as the values may have changes as time elapsed (e.g., continued changes to one or more of user device mobility, traffic loading, coverage). The radio intelligence controller 104 can determine, based on the additional data representing user device mobility, traffic loading, and coverage, another particular downlink operating schema to assign to a user device that is different than the downlink operating schema previously assigned. For example, when the user device mobility has increased to meet or exceed a threshold based on the additional data, and which was not previously met in the original data received, the radio intelligence controller 104 can determine that a different operating schema is to be selected and assigned. In such an example, where a reciprocity-based operating schema was previously determined, the radio intelligence controller 104 may now determine to assign a non-reciprocity-based operating schema in view of the increased user device mobility meeting the threshold, among other data points in the additional data. Based on the change in data and determination, the radio intelligence controller 104 can subsequently schedule and subsequently transmit one or more additional communications between the base station and the user device in accordance with this other particular downlink operating schema now assigned to the user device. In this manner, the radio intelligence controller 104 can periodically determine whether and when to modify the particular downlink operating schema that is presently assigned to the user device based on one or more changes to one or more of user device mobility, traffic loading, and/or coverage, as represented in subsequently received data. In further aspects, a duration of periodicity for determining whether and when to modify the particular downlink operating schema that is presently assigned to the user device may decrease when user device mobility increases so that determinations are made more often/with increased frequency.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of a device or component.

Turning to FIG. 3, a method 300 is provided for dynamically switching between MIMO algorithms to improve spectral efficiency and capacity. In some aspects, the method 300 can be a computer-implemented method. In one aspect, one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 300, can specify a sequence of steps of the method 300, and/or can identify particular component(s) of software and/or hardware for performing one or more of the steps of the method 300, in aspects. As discussed below, the method 300 can be performed using software, hardware, component(s), and/or device(s) depicted in the example of FIG. 1.

At block 302, data representing user device mobility, traffic loading, and coverage is received. At block 304, based on the data representing user device mobility, traffic loading, and coverage, a particular downlink operating schema is determined to be assigned to a user device, the downlink operating schema being one of reciprocity-based single-user multiple-input multiple-output (SU-MIMO) schema, non-reciprocity-based SU-MIMO schema, reciprocity-based multiple-user multiple-input multiple-output (MU-MIMO) schema, or non-reciprocity-based MU-MIMO schema. At block 306, one or more communications from the base station to the user device are scheduled for transmission in accordance with the particular downlink operating schema. At block 308, the one or more communications are transmitted from the base station to the user device using the particular downlink operating schema.

Figure 4:
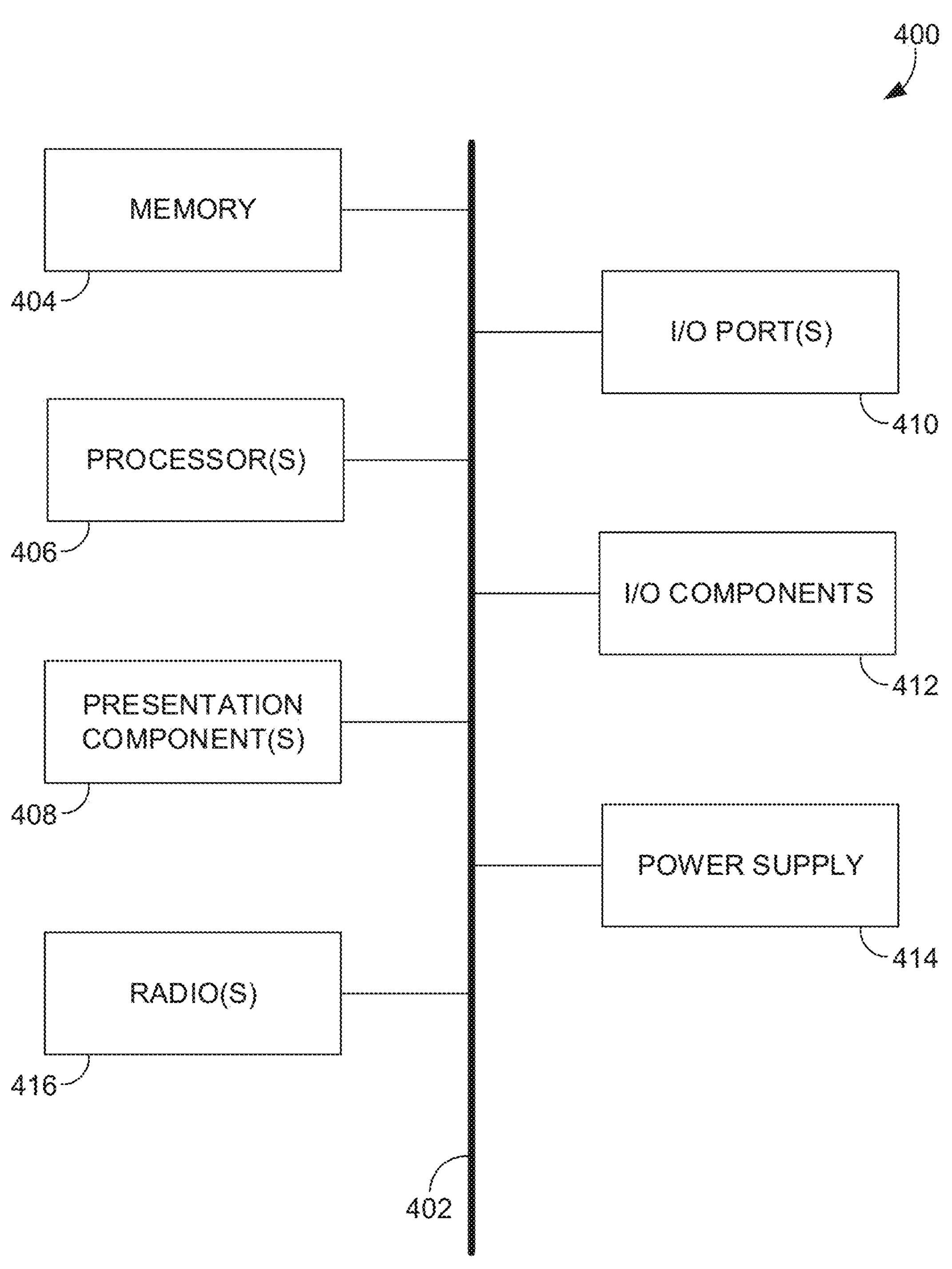
FIG. 4 illustrates an example computing device suitable for use in implementations of the present disclosure.

Turning now to FIG. 4, a diagram is depicted of an example computing device suitable for use in implementations of the present disclosure. Computing device 400 is but one example of a suitable computing environment and is not intended to suggest any limitation as to the scope of use or functionality of the invention. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples with the following devices: memory 404, one or more processors 406, one or more presentation components 408, input/output (I/O) ports 410, I/O components 412, and power supply 414. Bus 402 represents what may be one or more buses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 412. Also, processors, such as one or more processors 406, have memory. Distinction is not made between such categories as "workstation," "server," "laptop," "handheld device," etc., as all are contemplated within the scope of FIG. 8 and refer to "computer" or "computing device."

Computing device 400 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 404 includes computer-storage media in the form of volatile and/or non-volatile memory. Memory 404 may be removable, non-removable, or a combination thereof. Examples of memory include solid-state memory, hard drives, optical-disc drives, etc. Computing device 400 includes one or more processors 406, which read data from various entities such as bus 402, memory 404, or I/O components 412. One or more presentation components 408 present data indications to a person or other device. Examples of one or more presentation components 408 include a display device, speaker, printing component, vibrating component, etc. I/O ports 410 allow computing device 400 to be logically coupled to other devices including I/O components 412, some of which may be built in computing device 400. Illustrative I/O components 412 include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various aspects the radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:

receiving data representing metrics associated with a user device, wherein the metrics associated with the user device comprise user device mobility data;

determining, based on the metrics associated with the user device, to assign one downlink operating schema to the user device, the downlink operating schema being one of:

reciprocity-based, single-user, multiple-input, multiple-output (SU-MIMO) schema;

non-reciprocity-based SU-MIMO schema;

reciprocity-based, multiple-user, multiple-input, multiple-output (MU-MIMO) schema; or non-reciprocity-based MU-MIMO schema; and scheduling a communication for transmission from a base station to the user device in accordance with the one downlink operating schema.

2. The method of claim 1, wherein the user device mobility data comprises a value specifying a speed of physical movement associated with the user device.

3. The method of claim 2, wherein when the user device mobility increases, one of the non-reciprocity-based SU-MIMO or the non-reciprocity-based MU-MIMO is assigned.

4. The method of claim 2, wherein when the user device mobility decreases, one of the reciprocity-based SU-MIMO or the reciprocity-based MU-MIMO is assigned.

5. The method of claim 1, wherein the metrics associated with the user device comprise traffic loading data.

6. The method of claim 5, wherein the traffic loading data comprises a total quantity of data held in a buffer.

7. The method of claim 1, wherein the metrics associated with the user device comprises coverage data.

8. The method of claim 7, wherein the coverage data comprises one or more of RSRP value, RSRQ value, or inter-site distance (ISD).

9. The method of claim 1, comparing the data for each of the user device mobility, traffic loading, and coverage to one or more corresponding thresholds.

10. One or more non-transitory computer-readable media storing instructions that when executed via one or more processors perform a computerized method, the media comprising:

receiving data representing a metric associated with a user device;

determining, based on the metric associated with the user device, to assign one downlink operating schema to the user device, the downlink operating schema being one of:

reciprocity-based, single-user, multiple-input, multiple-output (SU-MIMO) schema;

non-reciprocity-based SU-MIMO schema;

reciprocity-based, multiple-user, multiple-input, multiple-output (MU-MIMO) schema; or non-reciprocity-based MU-MIMO schema; and scheduling a communication for transmission from a base station to the user device in accordance with the one downlink operating schema;

transmitting the one or more communications from the base station to the user device using the downlink operating schema; and periodically determining to modify the downlink operating schema assigned to the user device when an additional metric is received.

11. The media of claim 10, further comprising, via the one or more processors, subsequently receiving an additional metric.

12. The media of claim 11, further comprising, via the one or more processors, subsequently determining, based on the additional metric, a different downlink operating schema to assign to the user device that is different from the downlink operating schema previously assigned.

13. The media of claim 12, further comprising, via the one or more processors, subsequently scheduling one or more additional transmissions from the base station to the user device in accordance with the different downlink operating schema.

14. The media of claim 13, further comprising, via the one or more processors, subsequently communicating the one or more additional transmissions from the base station to the user device using the different downlink operating schema now assigned to the user device.

15. The media of claim 14, wherein a duration of periodicity for determining to modify the downlink operating schema decreases when the additional metric comprises a user device mobility value that has increased.

16. A system comprising:

one or more processors coupled to a base station, the one or more processors configured to:

receive data representing a metric associated with a user device;

determine, based on the metric associated with the user device, to assign one downlink operating schema to the user device, the downlink operating schema being one of:

reciprocity-based, single-user, multiple-input, multiple-output (SU-MIMO) schema;

non-reciprocity-based SU-MIMO schema;

reciprocity-based, multiple-user, multiple-input, multiple-output (MU-MIMO) schema; or non-reciprocity-based MU-MIMO schema; and schedule a communication for transmission from a base station to the user device in accordance with the one downlink operating schema;

transmit the one or more communications from the base station to the user device using the downlink operating schema;

receive additional data representing one or more of user device mobility, traffic loading, coverage, or a combination thereof; and determine whether to modify the downlink operating schema assigned to the user device based on the additional data.

* * * * *